(12) United States Patent
Yamada (10) Patent No.: US 8,422,101 B2
(45) Date of Patent: Apr. 16, 2013

(54) COLOR CONVERSION DEVICE

(75) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 946 days.

(21) Appl. No.: 12/501,835

(22) Filed: Jul. 13, 2009

(65) Prior Publication Data

US 2010/0033777 A1    Feb. 11, 2010

(30) Foreign Application Priority Data

Aug. 6, 2008 (JP) ................................. 2008-203066

(51) Int. Cl.
G03F 3/08 (2006.01)
(52) U.S. Cl.
USPC .............. 358/518; 358/1.9; 358/2.1; 345/601
(58) Field of Classification Search .................. 358/518, 358/1.9, 2.1; 345/601
See application file for complete search history.

(56) References Cited

U.S. PATENT DOCUMENTS

| | | | |
|---|---|---|---|
| 6,191,874 B1 | 2/2001 | Yamada | |
| 2002/0180755 A1* | 12/2002 | Krueger | 345/601 |
| 2004/0126009 A1 | 7/2004 | Takenaka et al. | |
| 2004/0239965 A1* | 12/2004 | Krueger et al. | 358/1.9 |
| 2007/0236758 A1 | 10/2007 | Ariga | |
| 2007/0253039 A1 | 11/2007 | Ariga | |
| 2007/0285525 A1 | 12/2007 | Okuyama | |

FOREIGN PATENT DOCUMENTS

| | | |
|---|---|---|
| JP | H09-27915 A | 1/1997 |
| JP | 9-181926 A | 7/1997 |
| JP | 10-13697 | 1/1998 |
| JP | 10-145616 A | 5/1998 |
| JP | 2004-112548 | 4/2004 |
| JP | 2005-262724 | 9/2005 |
| JP | 2006-253965 | 9/2006 |
| JP | 2007-282216 A | 10/2007 |
| JP | 2007-300631 A | 11/2007 |
| JP | 2007-336542 A | 12/2007 |

OTHER PUBLICATIONS

Japanese Official Action dated Apr. 27, 2010 together with English translation.

* cited by examiner

Primary Examiner — Kimberly A Williams
(74) Attorney, Agent, or Firm — Scully, Scott, Murphy & Presser, P.C.

(57) ABSTRACT

A color conversion device includes a profile storage unit, a saturation determining unit, a first selecting unit, and a conversion unit. The profile storage unit stores a plurality of profiles, each profile indicating correspondence relationships between input color signals representing values in an input color space defined in an input-side device and output color signals representing values in an output color space defined in an output-side device. The saturation determining unit is configured to determine a saturation of pixel data in input image data, the input image data being represented by input color signals and including a plurality of regions, each region containing at least one set of pixel data. The first selecting unit is configured to select, for each region, one profile among the plurality of profiles as an active profile based on the saturation of the at least one set of pixel data that is contained in the each region. The conversion unit that converts the input image data into print data represented by output color signals, by converting each set of pixel data based on the active profile that is selected for a region that contains the each set of pixel data.

12 Claims, 8 Drawing Sheets

COLOR CONVERSION DEVICE

CROSS REFERENCE TO RELATED APPLICATION

This application claims priority from Japanese Patent Application No. 2008-203066 filed Aug. 6, 2008. The entire content of this priority application is incorporated herein by reference.

TECHNICAL FIELD

The present invention relates to a color conversion device.

BACKGROUND

Conventional printers that print image with color materials (toner, ink, and the like) in the colors cyan, magenta, yellow, and black (CMYK) have been capable of reducing the achromatic (gray) component produced when mixing the colors C, M, and Y and replacing this component with the K color material.

One reason for doing this is that the density of the toner or other color material often fluctuates in laser printers. These fluctuations in density often result in the gray component having a colored tint when gray is printed using a mixture of C, M, and Y color materials. The gray can be printed with greater stability by using a color conversion profile that gives priority to the K color material.

However, when using a color conversion profile that emphasizes the K color material, the amount of CMYK color materials used for colors approaching gray are found through interpolation based on set values for gray and colors near gray. As a result, the K color material is often used for rendering dark flesh tones and dark blues, but the K color material gives the flesh tones and blues a noticeable grainy appearance.

On the other hand, while a profile giving priority to C, M, and Y color materials reduces the grainy appearance of flesh tones and blues, the gray tones often take on a color tint, as described above. Therefore, it is difficult to obtain satisfactory printing results when the image to be printed includes a combination of colors with high saturation and colors with low saturation.

For example, a method of creating a color conversion table for converting the input image data to image data for printing on an inkjet printer is known, the color conversion table being designed to increase the amount of black ink generated as the saturation increases and to decrease the amount of black ink generated as the saturation decreases.

However, when using a single color conversion table to vary the priority of the K color material based on the amount of color saturation, it is difficult to apply optimum conversion values at points found through interpolation.

Specifically, it is very unrealistic to provide this type of color conversion table with density conversion values for all input colors. For example, if the input values are RGB values, each having 256 possible color levels, the color conversion table would have to store color conversion values for 256×256×256 colors. Since this is unrealistic, color conversion tables are generally provided with density conversion values only at lattice points (reference points) for 17×17×17 colors spaced at intervals of sixteen color levels, while density conversion values for colors that do not correspond to these lattice points are found through interpolation.

Hence, even when optimum conversion values are set for these lattice points, there is no guarantee that interpolation will render optimum conversion values for points other than the lattice points. For example, it is conceivable that more K color material than necessary will be used because a lattice point giving priority to the K color material is one of the lattice points used for interpolation, even when it would be normally desirable to use less K color material.

SUMMARY

In view of the foregoing, it is an object of the invention to provide a color conversion device capable of producing satisfactory printing results, even when the image being printed includes a combination of colors with high saturation and colors with low saturation.

In order to attain the above and other objects, the invention provides a color conversion device. The color conversion device includes a profile storage unit, a saturation determining unit, a first selecting unit, and a conversion unit. The profile storage unit stores a plurality of profiles, each profile indicating correspondence relationships between input color signals representing values in an input color space defined in an input-side device and output color signals representing values in an output color space defined in an output-side device. The saturation determining unit is configured to determine a saturation of pixel data in input image data, the input image data being represented by input color signals and including a plurality of regions, each region containing at least one set of pixel data. The first selecting unit is configured to select, for each region, one profile among the plurality of profiles as an active profile based on the saturation of the at least one set of pixel data that is contained in the each region. The conversion unit that converts the input image data into print data represented by output color signals, by converting each set of pixel data based on the active profile that is selected for a region that contains the each set of pixel data.

According to another aspect, the present invention provides a color conversion method comprising: determining a saturation of pixel data in input image data, the input image data being represented by input color signals and including a plurality of regions, the input color signals representing values in an input color space defined in an input-side device, each region containing at least one set of pixel data; selecting, for each region, one profile among a plurality of profiles as an active profile based on the saturation of the at least one set of pixel data that is contained in the each region, each profile indicating correspondence relationships between the input color signals and output color signals representing values in an output color space defined in an output-side device; and converting the input image data into print data represented by output color signals, by converting each set of pixel data based on the active profile that is selected for a region that contains the each set of pixel data.

According to another aspect, the present invention provides a computer-readable recording medium that stores a color conversion program. The color conversion program comprising instructions for: determining a saturation of pixel data in input image data, the input image data being represented by input color signals and including a plurality of regions, the input color signals representing values in an input color space defined in an input-side device, each region containing at least one set of pixel data; selecting, for each region, one profile among a plurality of profiles as an active profile based on the saturation of the at least one set of pixel data that is contained in the each region, each profile indicating correspondence relationships between the input color signals and output color signals representing values in an output color space defined in an output-side device; and converting the input image data into print data represented by output color signals, by converting each set of pixel data based on the active profile that is selected for a region that contains the each set of pixel data.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
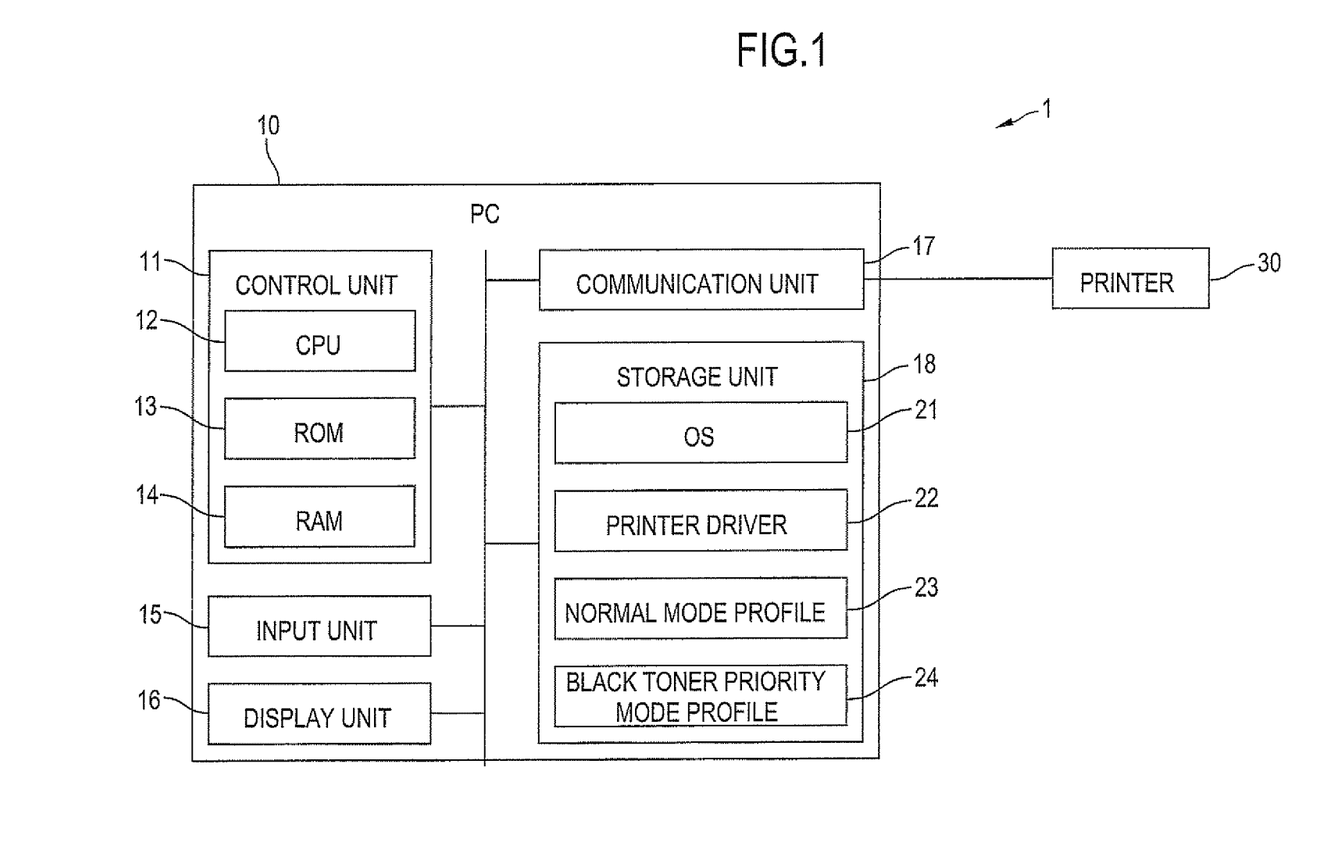
FIG. 1 is a block diagram showing electrical structure of color conversion system including a color conversion device according to a first embodiment illustrative aspects of the invention.
Figure 2:
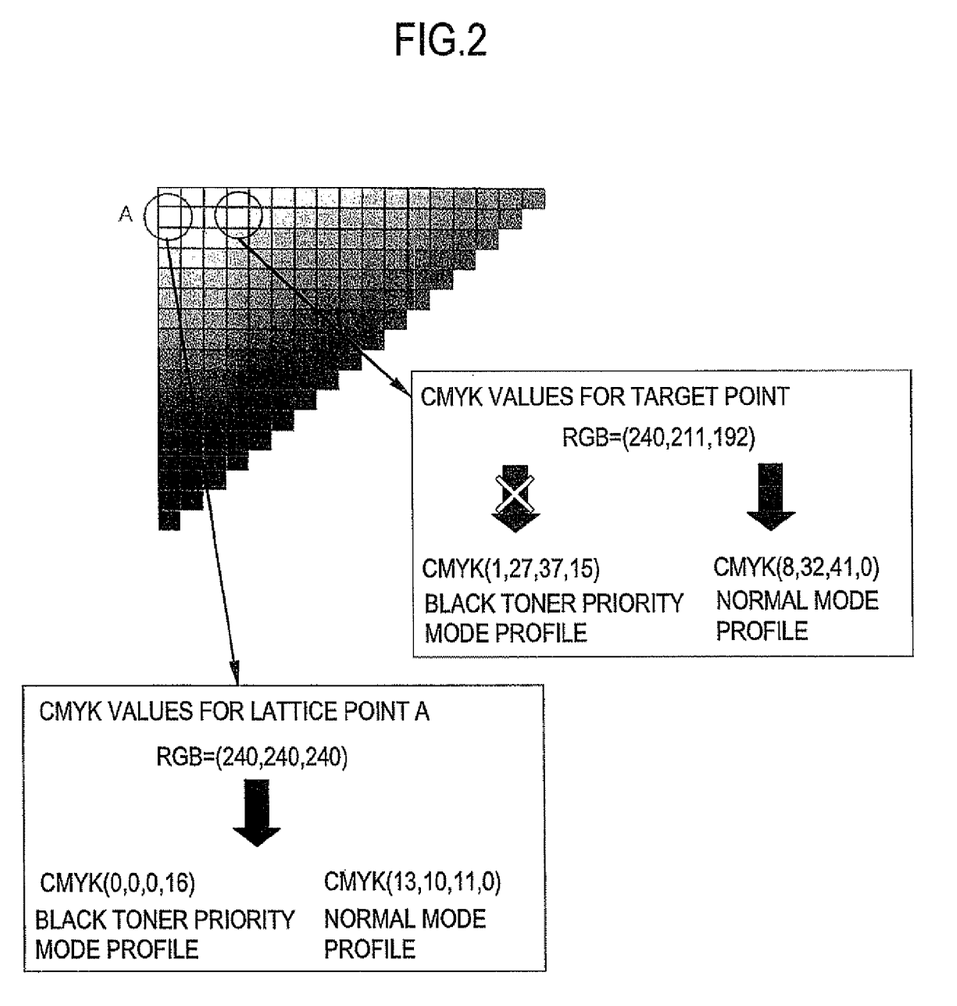
FIG. 2 is an explanatory diagram showing a print data generation process executed by the color conversion device.

A color conversion system 1 according to a first embodiment will be described with reference to FIGS. 1-3. As shown in FIG. 1, the color conversion system 1 includes a personal computer (thereafter referred as "PC") 10 and a printer 30. The PC 10 includes a control unit 11, input unit 15, display unit 16, communication unit 17, and storage unit 18. The control unit 11 is primarily configured of a microcomputer having a CPU 12, a ROM 13, and a RAM 14, and performs overall control of the components constituting the PC 10.

The input unit 15 enables a user to externally input instructions, such as a keyboard, a pointing device (mouse), and the like. The display unit 16 functions to display color images represented by RGB values, such as liquid crystal display. The communication unit 17 enables to transmit and receive data via network. In the first embodiment, the PC 10 is capable of communicating with the printer 30 via LAN (Local Area Network).

The printer 30 is a four-color laser printer capable of forming images by using four colors of toner (cyan, magenta, yellow, and black). When the printer 30 receives image data represented by CMYK values from the PC 10, the printer 30 forms an image on a recording sheet based on the image data.

The printer driver 22 is a software program that enables the user of the PC 10 to use the printer 30 via the PC 10. When the printer driver 22 is executed, the PC 10 performs a process (a print data generation process described later) to convert input image data (RGB data) in the device-dependent color space of the display unit 16 to print data (CMYK data) in the device-dependent color space of the printer 30.

The storage unit 18 also stores a normal mode profile 23 used for converting input image data to print data, and a black toner priority mode profile 24 having higher color values set for black toner than the normal mode profile 23. These profiles 23 and 24 are color conversion tables that associate conversion values with the lattice points (reference points) in the RGB color space defined in the PC 10 for converting RGB values (input color signal) to values in the CMYK color space defined in the printer 30. In the other words, each profile 23 and 24 indicates correspondence relationships for each lattice point between input color signals (RGB values) representing values in an RGB color space defined in the PC 10 and output color signals (CMYK values) representing values in a CMYK color space defined in the printer 30. An output color signal (CMYK values) are contained in the black toner priority mode profile 24 corresponding to each input color signal (RGB values) having a color value of black toner is higher than a color value of an output color signal (CMYK values) for the same input color signal (RGB values) in the normal mode profile 23.

The color conversion table does not store CMYK values for every possible combination of RGB values, but merely stores CMYK values corresponding to specific points (lattice points) in the RGB color space. Consequently, CMYK values for points other than lattice points are found through interpolation based on the lattice points. In the first embodiment, an RGB color space is represented by a cubic space having RGB axes, where each axis has a possible value from 0 to 255. The cubic space is divided by sixteen along each axis to obtain smaller cubes, and the vertices of the small cubes are used as lattice points in the color conversion table (a 17×17×17 table).

Next, a print data generation process will be described with reference to FIG. 2. Here, an example will be given for converting input image data whose RGB values are (240, 211, 192) at a point that does not coincide with a lattice point (hereinafter referred to as a "non-lattice point") to CMYK values. Since the input image data is for a non-lattice point, it is necessary to perform interpolation based on lattice points to calculate the CMYK values. A lattice point A having RGB values (240, 240, 240) on the gray axis will be one of the lattice points used in this calculation. The CMYK values assigned to lattice point A are (13, 10, 11, 0) in the normal mode profile 23 and (0, 0, 0, 16) in the black toner priority mode profile 24. Accordingly, the black component in the CMYK values calculated for the input pixel through interpolation differs greatly depending on which profile is used.

The profile is selected according to the following method. The PC 10 determines whether there is a black component (achromatic component) in the RGB values (240, 211, 192). If the black component K is 0, the PC 10 selects the normal mode profile 23. Specifically, the PC 10 calculates a theoretical value for K according to the following equations (1)-(4). In this example, the CMYK values are (15, 44, 63, 15).

$$C = 255 - R \quad (1)$$

$$M = 255 - G \quad (2)$$

$$Y = 255 - B \quad (3)$$

$$K = \mathrm{Min}(C, M, Y) \quad (4)$$

When K does not equal 0 (i.e., K>0), as in this example, the PC 10 selects a profile based on the theoretical saturation of the input pixel data. Specifically, a theoretical saturation S is calculated according to equation (5) below. In this example, the saturation S of the input pixel is (240−192)÷240=0.2, that is, 20%.

$$S = \{\mathrm{Max}(R,G,B) - \mathrm{Min}(R,G,B)\} \div \mathrm{Max}(R,G,B) \quad (5)$$

The PC 10 selects the normal mode profile 23 when the saturation S of the input pixel data is high, and more specifically when the calculated saturation S is higher than a prescribed value (10% in the first embodiment). However, the PC 10 selects the black toner priority mode profile 24 when the saturation S is no greater than the prescribed value, in other words, when the saturation S is smaller than or equal to the prescribed value. Since the saturation S is 20% in this example, which is higher than the prescribed value of 10%, the PC 10 selects the normal mode profile 23.

As a result, the PC 10 performs interpolation by using CMYK values (13, 10, 11, 0) at lattice point A in the normal mode profile 23, resulting in calculated CMYK values (8, 32, 41, 0) for RGB value (240, 211, 192) at the target point. Therefore, the printer 30 prints, without using black toner, an image based on input pixel data having higher saturation. If the PC 10 performs interpolation by using CMYK values (0, 0, 0, 16) at lattice point A in the black toner priority mode profile 24, the resulting calculated CMYK values would be (1, 27, 37, 15). Details of these calculations will not be included here.

Figure 3:
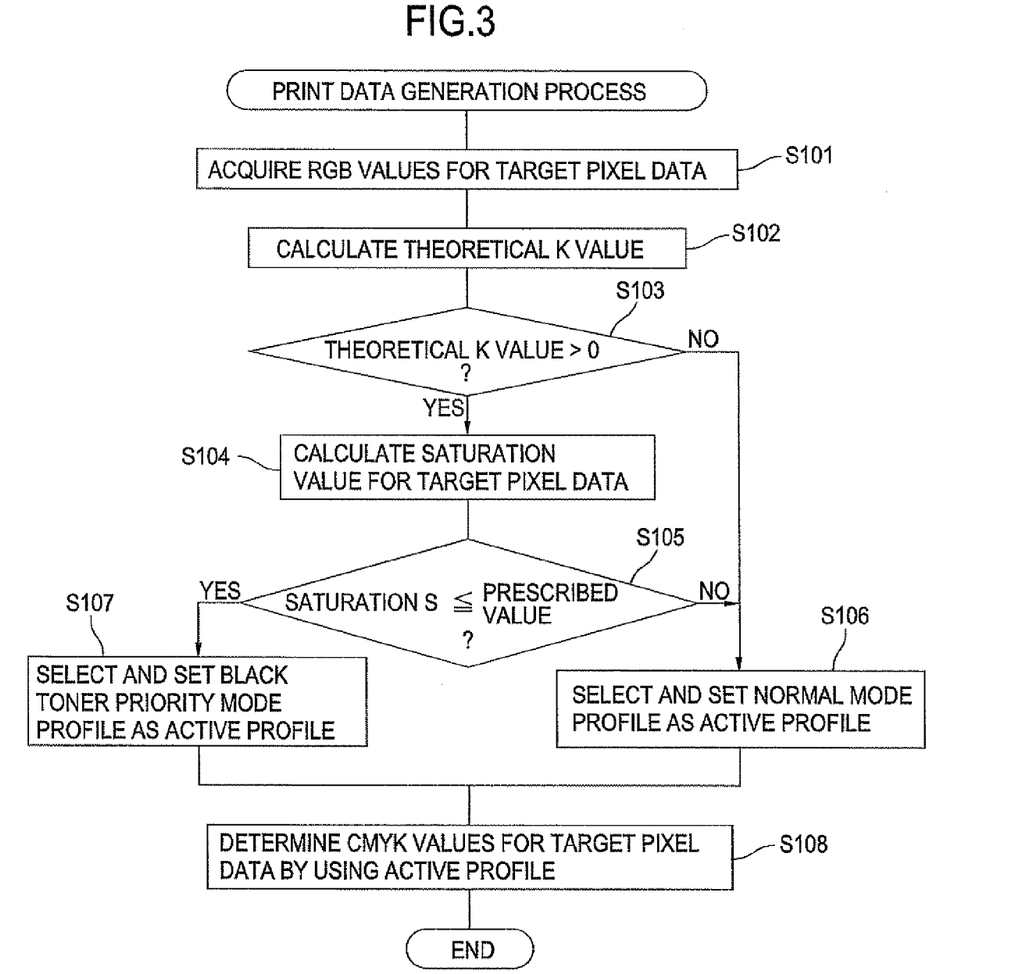
FIG. 3 is a flowchart illustrating steps in a print data generation process executed by the color conversion device according to the first embodiment.

FIG. 3 is a flowchart illustrating steps in a print data generation process executed by the control unit 11 of the PC 10 (and more specifically the CPU 12) as a function of the printer driver 22. The control unit 11 executes the print data generation process on pixel data associated with each pixel constituting an image when the PC 10 performs a printing operation on the image.

In S101 at the beginning of the print data generation process, the control unit 11 acquires RGB values for pixel data to be converted (hereinafter, to be referred as "target pixel data"). In S102 the control unit 11 calculates a theoretical K value representing K component of the target pixel data based on the RGB values acquired in S101 by using equations (1)-(4) described above.

In S103 the control unit 11 determines whether or not the theoretical K value calculated in S102 is greater than 0. In other words, the control unit 11 determines whether or not the theoretical K value is of target pixel data is zero in S103. That is, the control unit 11 determines whether the target pixel data has a color that can be rendered in black toner based on RGB-to-CMYK color conversion using the theoretical value (equations (1)-(4) described above). If the control unit 11 determines that the theoretical K value is greater than 0 (S103: YES), in S104 the control unit 11 calculates a saturation S of the target pixel data by using equation (5) described above.

In S105 the control unit 11 determines whether or not the saturation S calculated in S104 is smaller than or equal to the prescribed value (10% in the first embodiment). The prescribed value is preset as a threshold value for determining the level of saturation. When the control unit 11 determines in S105 that a saturation S is greater than or higher than the prescribed value (a saturation level of target pixel data is high; S105: NO) or when the control unit 11 determines in S103 that the theoretical value for K component is smaller than or equal to 0 (S103: NO), in S106 the control unit 11 selects and sets the normal mode profile 23 as the active profile. Subsequently, the control unit 11 advances to S108.

However, if the control unit 11 determines in S105 that the saturation S is lower than or equal to the prescribed value (a saturation level of target pixel data is low; S105: YES), in S107 the control unit 11 selects and sets the black toner priority mode profile 24 as the active profile and subsequently advances to S108.

In other words, in S105-S107 the control unit 11 determines whether a saturation level of each region of input image data is a first level (high) or a second level (low) based on the saturation of one set of pixel data, and then selects, for each region, one profile among a plurality of profiles as an active profile to be used for color conversion based on the saturation of at least one set of pixel data that is contained in the subject region. In the first embodiment, each region consists of one set of pixel data.

In S108 the control unit 11 finds or determines CMYK values for the target pixel data by using the active profile set in S106 or S107, and subsequently ends the print data generation process. By performing the print data generation process for a number of times corresponding to a number of pixel data of the input image data, the control unit 11 converts the input image data into print data represented by CMYK values by converting each set of pixel data based on the active profile that is selected for a region (one set of pixel data) that contains the each set of pixel data.

As described above, the PC 10 according to the first embodiment selectively uses a profile for each set of input pixel data corresponding to each pixel in an image represented by the input image data based on the saturation S of each pixel data. Consequently, the PC 10 uses the black toner priority mode profile 24 having high color values for K toner on pixel data with low saturation that include the achromatic color, and uses the normal mode profile 23 with low color values for K toner on pixel data with high saturation. This method makes it unlikely that color tints will creep into achromatic color components in a printed image and reduces the likelihood of the printed image having graininess in areas of high saturation caused by black toner. As a result, the PC 10 can produce satisfactory printing results.

By selectively using a profile for each set of pixel data corresponding to each pixel, which is the smallest unit of the image represented in the input image data, the PC 10 can use the best-suited profile for each pixel in an image having a combination of low-saturation areas and high-saturation areas.

The PC 10 also uses a prescribed value as a reference to facilitate determination of whether each set of pixel data has a high saturation or a low saturation. Furthermore, if the PC 10 determines that pixel data does not include a K component, in other words, if the PC 10 determines that a theoretical K value is zero (S103: NO), the PC 10 selects the normal mode profile 23 in S106 without determining the saturation of the pixel data in S104 and S105. Hence, this method eliminates the determination of saturation for pixel data that are found not to have a black component, thereby reducing the process time of the print data generation process by the amount of time required for determining saturation.

Next, a print data generation process executed in a second embodiment will be described with reference to FIGS. 4-7. The PC 10 according to the second embodiment has the same basic structure as the PC 10 according to the first embodiment shown in FIG. 1, differing only in the content of the print data generation process performed. In the print data generation process of the first embodiment shown in FIG. 3, the PC 10 sets the active profile for each pixel data. In contrast, in the print data generation process according to the second embodiment, the PC 10 selects and sets the active profile for each "object data" in an image represented by the input image data.

Figure 4:
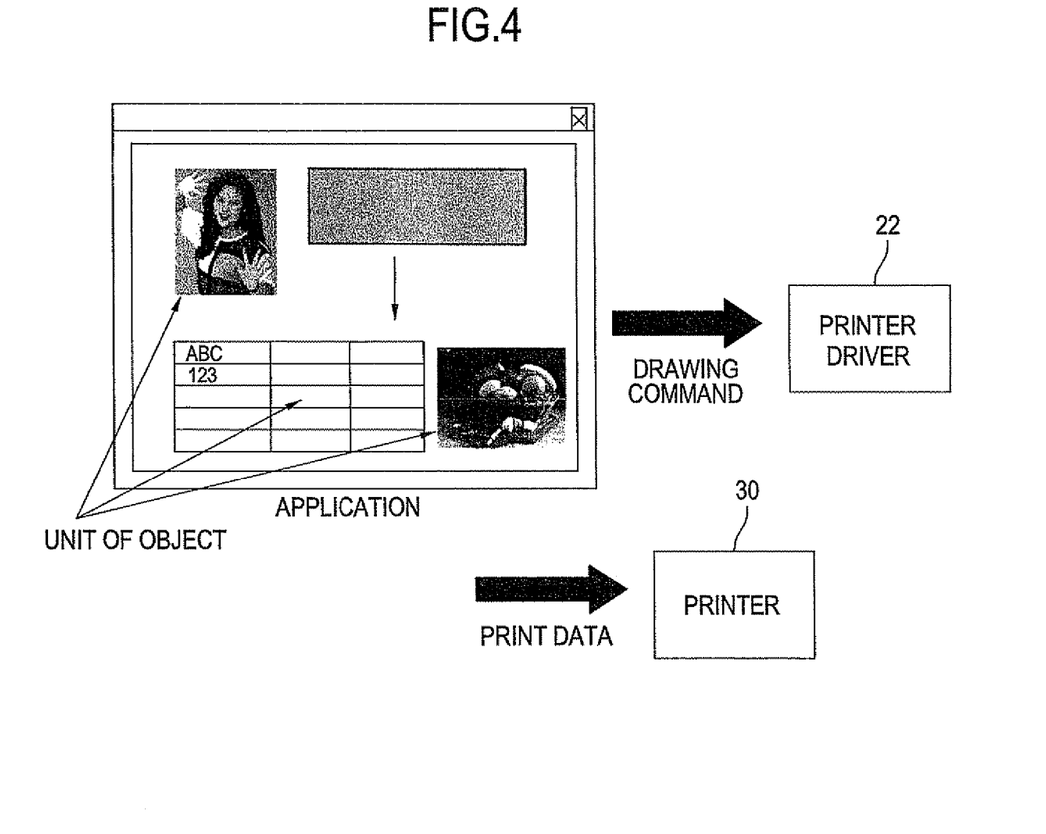
FIG. 4 is an explanatory diagram showing a print data generation process executed by a color conversion device according to a second embodiment.

More specifically, as illustrated in FIG. 4, an application running on the PC 10 may transmit a drawing command for a plurality of objects in an image to the printer driver, and the printer driver converts data contained in the drawing command for an object into image data. In other words, the printer driver creates a plurality of sets of object data in response to the drawing command. The object data contains at least one set of pixel data. At this time, the PC 10 determines an overall saturation level for each set of object data, and selects and stores profile data representing an active profile to be used for color conversion of pixel data that are contained in the object data. When subsequently converting RGB values of each set of pixel data to CMYK values, the PC 10 references the profile data that was previously stored and uses the corresponding active profile based on the profile data. In other words, the PC 10 uses the same profile for all pixel data that are contained in the same object data.

Figure 5:
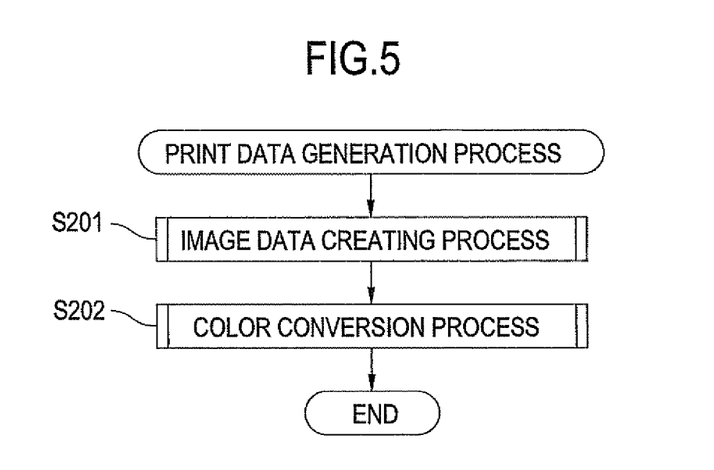
FIG. 5 is a flowchart illustrating steps in the print data generation process executed by the color conversion device according to the second embodiment.

As shown in FIG. 5, the control unit 11 executes a print data generation process that includes an image data creating process in S201 and a color conversion process in S202. Through the image data creating process of S201, the control unit 11 selects and determines, for each region, which the normal mode profile 23 and the black toner priority mode profile 24 is set as the active profile for each region (for each set of object data). In the second embodiment, each region consists of one set of object data. Through the color conversion process of S202, the control unit 11 converts the input image data into print data by converting each set of pixel data based on the active profile selected for a region (object data) that contains the each set of pixel data.

Figure 6:
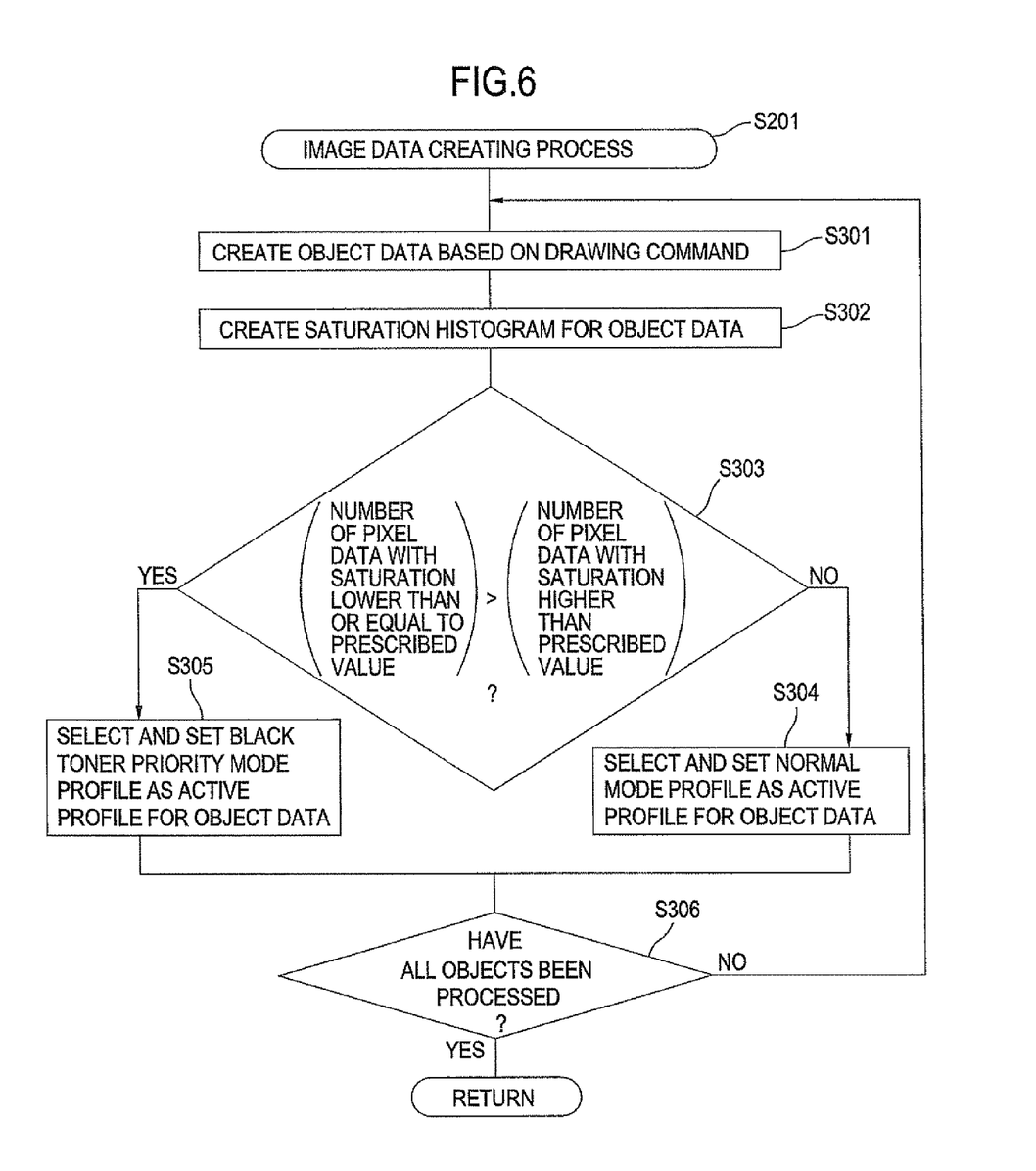
FIG. 6 is a flowchart illustrating steps in an image data creating process of the print data generation process executed by the color conversion device according to the second embodiment.

As shown in FIG. 6, in S301 at the beginning of the image formation process, the control unit 11 acquires a drawing command and executes a drawing process for creating one set of object data based on the drawing command. Based on one drawing command, the control unit 11 can create a plurality of sets of object data each constituting the plurality of regions in the input image data. Each set of object data contains at least one set of pixel data. The drawing process is executed for each object, whereby each pixel data in the object data is arranged at a prescribed position in the print data. Hence, the image data creating process of FIG. 6 (S301-S306) is repeated a number of times equivalent to the number of objects in the image represented by input image data based on the drawing command.

In S302 the control unit 11 creates a saturation histogram for the object data created in S301. Specifically, the control unit 11 creates a saturation histogram for the object data by calculating a saturation S of each pixel data that is contained in the object data. The saturation S of each pixel data is calculated according to the same method described in S104 of the first embodiment.

In S303, by using the saturation histogram created in S302, the control unit 11 determines, for each set of pixel data, whether or not a saturation of the each set of pixel data is higher than a prescribed value, and determines whether or not the number of pixel data contained in the object data and having a saturation S lower than or equal to a prescribed value (10% in the second embodiment) is greater than the number of pixel data contained in the object data and having a saturation S higher than the prescribed value. In other words, the control unit 11 determines the overall saturation level of the object data based on the percentage of pixel data with low saturation. The method of determining the overall saturation level of an object is not limited to a method based on the percentage of pixels with low saturation. For example, the overall saturation level of object data may be determined based on the average saturation in all set of pixel data that are contained in the object data or based on the number of pixel data that has lower (or higher) saturation than a prescribed value.

If the control unit 11 determines that there are not a greater number of sets of pixel data with a saturation S lower than or equal to the prescribed value (the overall saturation level is high; S303: NO), in S304 the control unit 11 selects and sets the normal mode profile 23 as the active profile to be used on the pixel data that are contained in the current object data. Subsequently, the control unit 11 advances to S306. However, if the control unit 11 determines that there are more pixel data with a saturation lower than or equal to the prescribed value (the overall saturation level is low; S303: YES), in S305 the control unit 11 selects and sets the black toner priority mode profile 24 as the active profile to be used on the pixel data that are contained in the current object data. Subsequently, the control unit 11 advances to S306.

In other words, in S303 the control unit 11 determines whether a saturation level of each region (one set of object data, the second embodiment) is a first level (high) or a second level (low) lower than the first level based on the first level based on the saturation of the pixel data that are contained in the each region, and then selects, for each region, one profile among a plurality of profiles as an active profile to be used for color conversion based on the saturation of at least one set of pixel data that is contained in the each region.

In S306 the control unit 11 determines whether or not there remain any unprocessed objects. In other words, the control unit 11 determines whether or not all sets of object data have been processed in S306. The control unit 11 returns to S301 to create next object data corresponding to next object based on the drawing command if all objects have not been processed (S306: NO) and ends the image data creating process if all objects have been processed (S306: YES).

Figure 7:
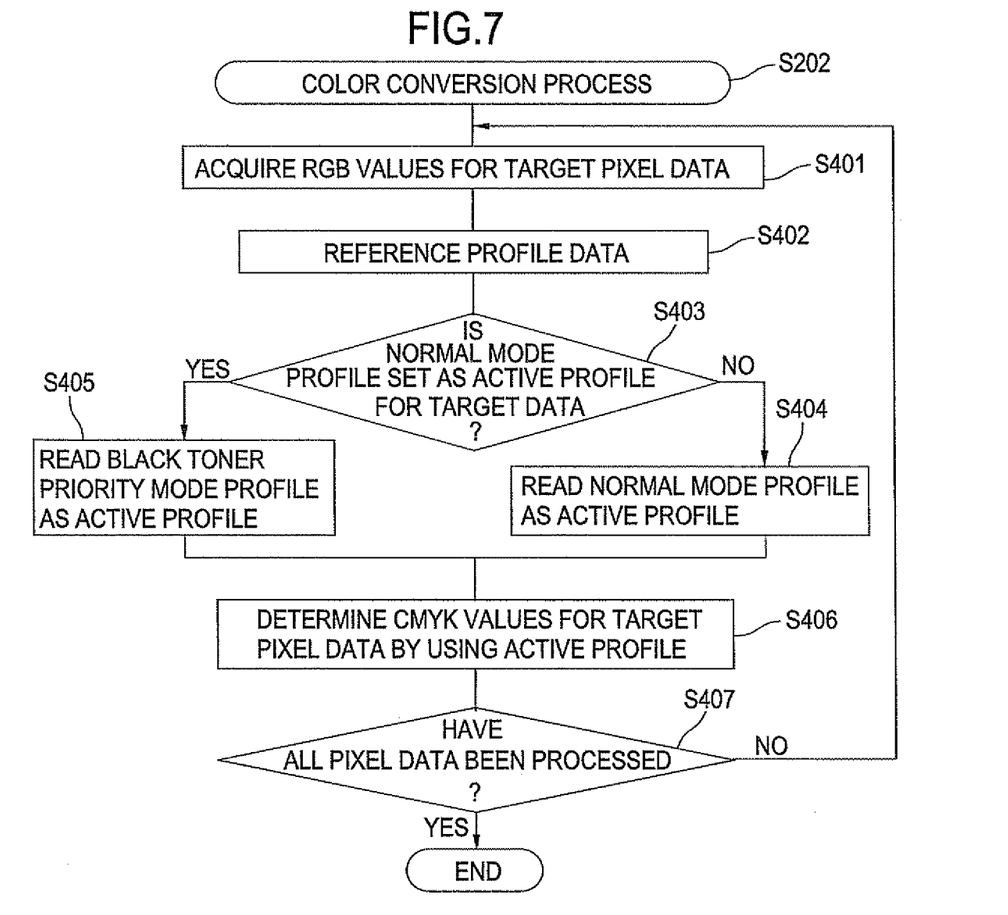
FIG. 7 is a flowchart illustrating steps in a color conversion process of the print data generation process executed by the color conversion device according to the second embodiment.

Next, in S401 at the beginning of the color conversion process of FIG. 7, the control unit 11 acquires RGB values for pixel data to be subjected to color conversion (target pixel data). In S402 the control unit 11 references the active profile that was set in S304 or S305 of the image data creating process shown in FIG. 6.

In S403 the control unit 11 determines whether or not the active profile referenced in S402 is the normal mode profile 23. If the active profile has been set to the normal mode profile 23 (S403: YES), in S404 the control unit 11 reads the normal mode profile 23 as the active profile and subsequently advances to S406.

However, if the active profile has not been set to the normal mode profile 23 (S403: NO), in S405 the control unit 11 reads the black toner priority mode profile 24 as the active profile and subsequently advances to S406.

In S406 the control unit 11 finds and determines CMYK values for the target pixel data using the active profile. Subsequently, the control unit 11 determines whether or not all pixel data have been processed (S407). If the control unit 11 determines that all pixel data have not been processed (S407: NO), the control unit 11 returns to S401. If the control unit 11 determines that all pixel data have been processed (S407:

YES), the control unit 11 ends the color conversion process (print data generation process).

As described above, the PC 10 according to the second embodiment selectively uses a profile for each object in the input image data based on the saturation of the object data. Consequently, the PC 10 uses the black toner priority mode profile 24 having high color values for K toner on pixel data that is contained in object data with low overall saturation level including the achromatic color, and uses the normal mode profile 23 with low color values for K toner on pixel data that is contained in object data with high overall saturation level. This method makes it unlikely that color tints will creep into achromatic color components in a printed image and reduces the likelihood of the printed image having graininess in areas of high saturation caused by black toner. As a result, the PC 10 can produce satisfactory printing results.

Further, by using the same profile for all pixel data included in the same object data, the PC 10 according to the second embodiment can avoid producing an unnatural appearance in the printed image when a single object includes a mixture of pixels with different profiles (for example, mottled flesh tones produced when converting pixels using different active profiles).

Figure 8:
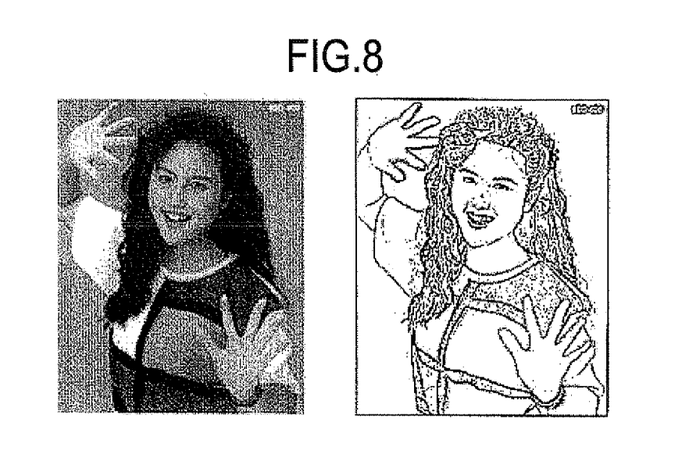
FIG. 8 is an explanatory diagram showing a print data generation process executed by a color conversion device according to a third embodiment.

Next, an image data creating process executed in a third embodiment will be described with reference to FIGS. 8-10. The PC 10 according to the third embodiment has the same basic structure as the PC 10 according to the first and second embodiments shown in FIG. 1, differing only in the content of the image data creating process in print data generation process. In the image data creating process of the second embodiment shown in FIG. 6, the PC 10 sets the active profile for each object. In contrast, in the image data creating process according to the third embodiment, the PC 10 sets the active profile for each "edge-defined region" in an image represented by the input image data.

Specifically, it is not possible to divide photographic image data, such as data in the bitmap (BMP) file format (a raster graphics format), into units of objects, as was done with the images described in the second embodiment (image data created according to function objects). In this case, it is necessary to extract edges in the image data and to divide the image data into continuous regions defined by these edges (hereinafter referred to as "edge-defined regions"). For example, it is likely that a profile picture of a person might be divided into a skin region (area with relatively high saturation) and a hair region (area with relatively low saturation). Therefore, the PC 10 determines the saturation level for each edge-defined region and selects and sets a profile based on this saturation level to be used on all sets of pixel data that are included in the edge-defined region. In other words, the PC 10 uses the same profile for all sets of pixel data that are contained in the same edge-defined region.

Figure 9:
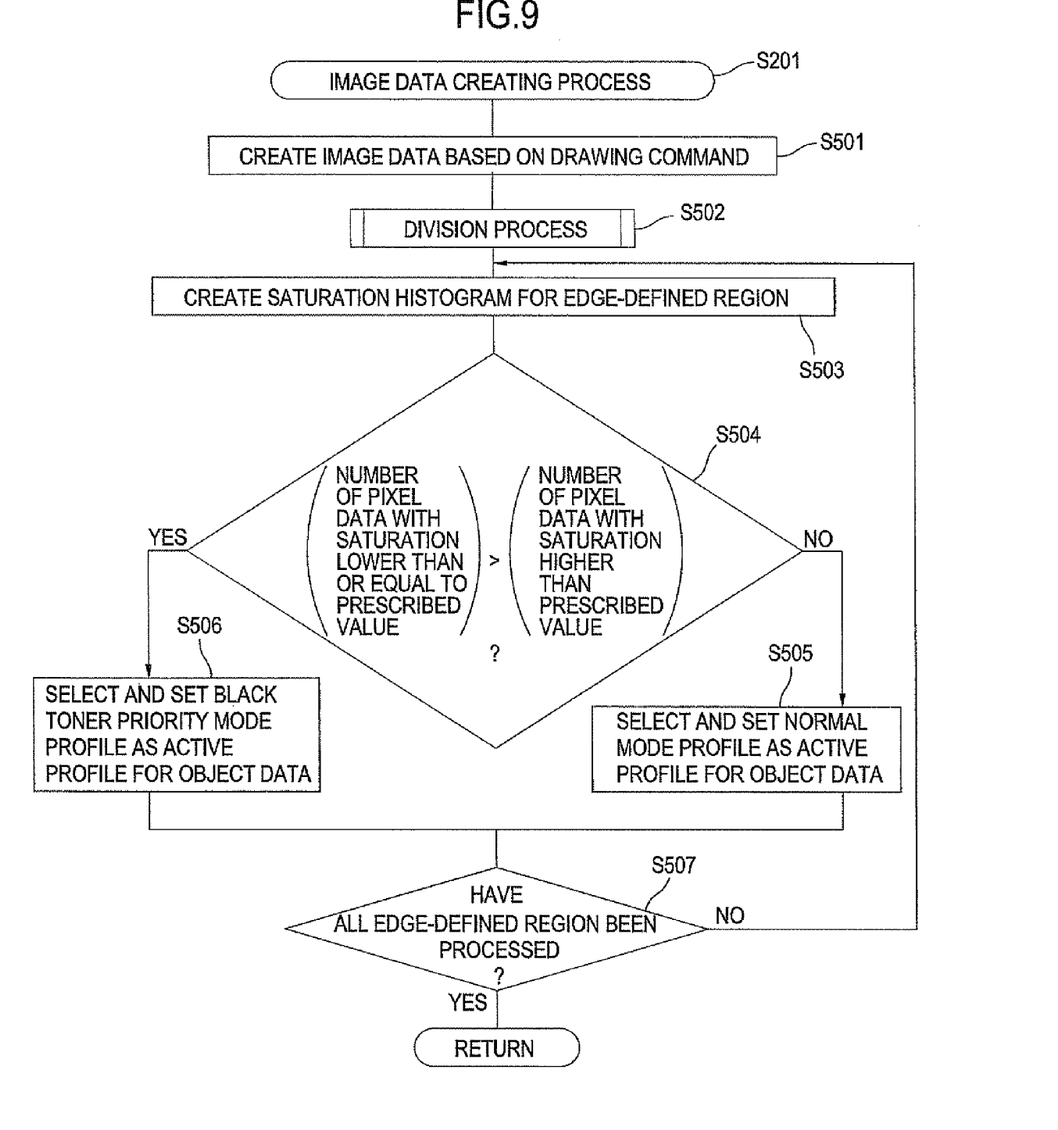
FIG. 9 is a flowchart illustrating steps in an image data creating process of a print data generation process executed by the color conversion device according to the third embodiment.
Figure 10:
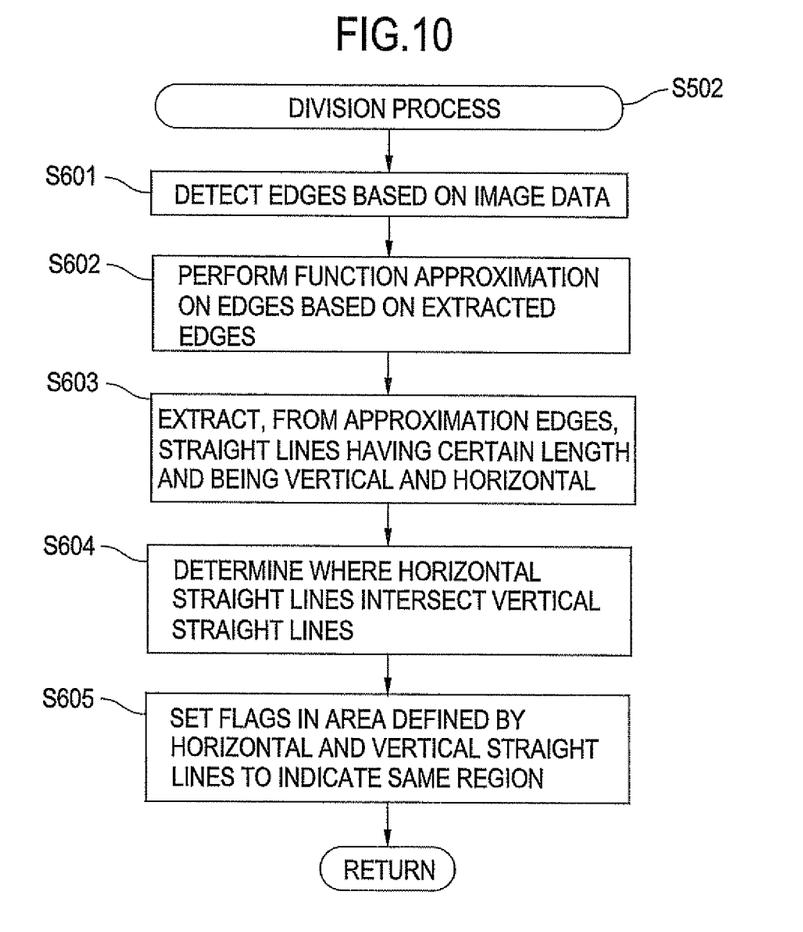
FIG. 10 is a flowchart illustrating steps in a division process of the image data creating process executed by the color conversion device according to the third embodiment.

In S501 at the beginning of the image data creating process in FIG. 9, the control unit 11 executes a drawing process in response to a drawing command and creates input image data based on the drawing command. In S502 the control unit 11 executes a division process to divide the image data into edge-defined regions defined by lines.

The division process will be described with reference to FIG. 10. In S601 at the beginning of the division process, the control unit 11 detects and extracts edges in the image based on the image data, and in S602 performs a function approximation on the edges based on the detected edges. In S603 the control unit 11 extracts, from the function approximation edges, straight lines that are a certain length and either vertical or horizontal.

Here, a method well known in the art may be used to detect lines in an extracted edge. For example, "A Study on Scalable and High-Precision Function Approximation of Contours in Multicolor Images and Its Applications" by Tetsuo Sugiyama of the University of Tsukuba, Graduate School of Systems and Information Engineering (https://www.tulips.tsukuba.ac.jp/pub/dl/e#thesis/ko/sugiyama2004.pdf) describes a method of approximating corner points in edges by finding edges in an image as lines of points though contour tracing, extracting corner points at which the lines curve, and dividing the edges at these corner points.

Edge detection may also be performed using the well-known Hough transform. The Hough transform can be used to find a suitable array of points, i.e., a straight line that passes through a certain point, by finding points in an infinite number of straight lines passing through the target point and setting flags on (also referred to as "voting for") points falling in a straight line.

In S604 the control unit 11 determines where horizontal straight lines among the extracted lines intersect vertical straight lines. In S605 the control unit 11 sets flags in areas defined by the horizontal and vertical straight lines to indicate points in the same region. In other words, in S604 and S605 the control unit 11 determines a region defined by the horizontal straight lines and the vertical straight lines. Therefore, the control unit 11 divides the image data into a plurality of edge-defined regions. In this case, because edge-defined regions being defined by the horizontal straight lines and the vertical straight lines, the control unit 11 divides the image data into a plurality of edge-defined regions corresponding to a plurality of sets of object data described in the second embodiment. Subsequently, the control unit 11 advances to S503 in FIG. 9.

Following processes of S503-S507 are repeated a number of times equivalent to the number of edge-defined regions in the image represented by input image data. In S503 the control unit 11 creates a saturation histogram for the edge-defined region in S301. The control unit 11 creates a saturation histogram by calculating saturation S for each pixel data contained in the edge-defined region. The saturation S for each set of pixel data is calculated according to the same method described in S104 and S303 of the first and second embodiments.

In S504 the control unit 11 uses the saturation histogram created in S503 to determine whether or not the number of pixel data with a saturation S lower than or equal to the prescribed value (10% in the third embodiment) is greater than the number of pixels with a saturation S higher than the prescribed value. In the third embodiment, each region consists of an edge-defined region. In other words, the control unit 11 determines whether the overall saturation level of each edge-defined region is high or low based on the percentage of pixel data with low saturation.

If the control unit 11 determines that there are not a greater number of pixel data with a saturation S lower than or equal to the prescribed value (the overall saturation level is high; S504: NO), in S505 the control unit 11 selects and sets the normal mode profile 23 as the active profile to be used on the current edge-defined region. Subsequently, the control unit 11 advances to S507. However, if the control unit 11 determines that there are more pixel data with a saturation S lower than or equal to the prescribed value (the overall saturation level is low; S504: YES), in S506 the control unit 11 selects and sets the black toner priority mode profile 24 as the active profile to be used on the current edge-defined region. Subsequently, the control unit 11 advances to S507.

In other words, in S504-S506 the control unit 11 determines whether a saturation level of each region is a first level (high) or a second level (low) lower than the first level based on the first level based on the saturation of the pixel data that are contained in the each region, and then selects, for each region, one profile among a plurality of profiles as an active profile to be used for color conversion based on the saturation of at least one set of pixel data that is contained in the each region. In the third embodiment, each region consists of an edge-defined region.

In S507 the control unit 11 determines whether or not all edge-defined regions have been processed. The control unit 11 returns to S503 if all edge-defined regions have not been unprocessed (S507: NO) and ends the current image data creating process if all edge-defined regions have been processed (S507: YES).

As described above, the PC 10 according to the third embodiment selectively uses a profile for each edge-defined region in the input image data based on the saturation of the edge-defined region. Consequently, the PC 10 uses the black toner priority mode profile 24 having high color values for K toner on pixel data that are contained in an edge-defined region with low saturation that includes the achromatic color, and uses the normal mode profile 23 with low color values for K toner on pixel data that are contained in an edge-defined region with high saturation. This method makes it unlikely that color tints will creep into achromatic color components in a printed image and reduces the likelihood of the printed image having graininess in areas of high saturation caused by black toner. As a result, the PC 10 can produce satisfactory printing results.

Further, by using the same profile for all pixel data included in the same edge-defined region, the PC 10 according to the third embodiment can avoid producing an unnatural appearance in the printed image when a single object includes a mixture of pixels with different profiles (for example, mottled flesh tones produced when converting pixels using different active profiles).

Further, the PC 10 according to the third embodiment can easily determine whether or not overall saturation level of each edge-defined region is high by comparing with the prescribed value.

While the invention has been described in detail with reference to the first, second, and third embodiments thereof, it would be apparent to those skilled in the art that various changes and modifications may be made therein without departing from the spirit of the invention.

In the first, second, and third embodiments described above, the PC 10 selects one between two types of profiles, the normal mode profile 23 and the black toner priority mode profile 24, but the PC 10 may instead be configured to choose among three or more profiles based on the saturation level.

In the first, second, and third embodiments described above, the PC 10 converts input image data in the RGB color space to print data in the CMYK color space, but the color spaces are not limited to those used in the first, second, and third embodiments. For example, the color space of the print data may additionally include light cyan, light magenta, and light yellow, provided that the print data is expressed with color values for the color materials used in printing including a plurality of chromatic (CMY, for example) color materials that can render an achromatic color when mixed and a black (K) color material. Since the input image data does not have such restrictions, any type of color system may be employed.

Further, while the first, second and third embodiments are described for converting image data into print data for a color laser printer, the present invention may also be applied for converting image data into print data for an inkjet printer.

Further, while the PC 10 performs the print data generation process in the first, second and third embodiments, the printer 30 may perform the print data generation process.

Further, while the control unit 11 divides the image data into the edge-defined regions defined by lines during the division process in the third embodiment, the control unit may divide the image data into edge-defined regions defined by curve lines.

What is claimed is:

1. A color conversion device comprising:
   a profile storage unit that stores a plurality of profiles, each profile indicating correspondence relationships between input color signals representing values in an input color space defined in an input-side device and output color signals representing values in an output color space defined in an output-side device;
   a saturation determining unit that is configured to determine a saturation of pixel data in input image data, the input image data being represented by input color signals and including a plurality of regions, each region containing at least one set of pixel data;
   a first selecting unit that is configured to select, for each region, one profile among the plurality of profiles as an active profile based on the saturation of the at least one set of pixel data that is contained in the each region; and
   a conversion unit that converts the input image data into print data represented by output color signals, by converting each set of pixel data based on the active profile that is selected for a region that contains the each set of pixel data, wherein
   each output color signal has at least one among a black value corresponding to black color material and a plurality of chromatic color values corresponding to chromatic color materials, achromatic color being represented by using the black color material; the plurality of chromatic color materials; or the black color material and the plurality of chromatic color materials,
   the profile storage unit stores a first profile and a second profile, an output color signal contained in the second profile corresponding to each input color signal having a black value higher than a black value of an output color signal contained in the first profile for the same input color signal,
   the color conversion device further comprises a first determining unit that determines whether a saturation level of each region is a first level or a second level lower than the first level based on the saturation of the at least one set of pixel data that is contained in the each region, and
   the first selecting unit selects, for each region, the first profile as the active profile when the first determining unit determines that the saturation level of the each region is the first level, and the second profile as the active profile when the first determining unit determines that the saturation level of the each region is the second level.

2. The color conversion device according to claim 1, wherein each region consists of one set of pixel data;
   wherein the color conversion device further comprises a second determining unit that determines whether or not a saturation of each set of pixel data is higher than a prescribed value;
   wherein the first determining unit determines that a saturation level of each set of pixel data is the first level when the second determining unit determines that the saturation of the each set of pixel data is higher than the prescribed value, and determines that a saturation level of each set of pixel data is the second level when the second determining unit determines that the saturation of the each set of pixel data is lower than or equal to the prescribed value;

wherein the first selecting unit selects, for each set of pixel data, the first profile as the active profile when the first determining unit determines that the saturation level of the each set of pixel data is the first level, and the second profile as the active profile when the first determining unit determines that the saturation level of the each set of pixel data is the second level; and wherein the conversion unit converts the input image data into print data by converting each set of pixel data based on an active profile selected for the each set of pixel data.

3. The color conversion device according to claim 2, further comprising:

a theoretical black value determining unit that determines a theoretical black value of each set of pixel data;

a third determining unit that determines whether or not the theoretical black value of each set of pixel data is zero; and a second selecting unit that selects, for each set of pixel data, the first profile as the active profile when the third determining unit determines that the theoretical black value of the each set of pixel data is zero, wherein the saturation determining unit determines a saturation of each set of pixel data when the third determining unit determines that the theoretical black value of the each set of pixel data is not zero, wherein the first determining unit determines that a saturation level of each set of pixel data is the first level when the third determining unit determines that the theoretical black value of the each set of pixel data is not zero and the second determining unit determines that the saturation of the each set of pixel data is higher than the prescribed value, wherein the first determining unit determines that the saturation level of each set of pixel data is the second level when the third determining unit determines that the theoretical black value of the each set of pixel data is not zero and the second determining unit determines that the saturation of the each set of pixel data is lower than or equal to the prescribed value, and wherein the first selecting unit selects, for each set of pixel data, the first profile as the active profile when the first determining unit determines that the saturation level of the each set of pixel data is the first level, and the second profile as the active profile when the first determining unit determines that the saturation level of the each set of pixel data is the second level.

4. The color conversion device according to claim 1, further comprising:

an acquiring unit that acquires a drawing command; and an object data creating unit that creates a plurality of sets of object data based on the drawing command, the plurality of sets of object data constituting the plurality of regions in the input image data, each set of object data containing at least one set of pixel data.

5. The color conversion device according to claim 4, further comprising:

a fourth determining unit that determines, for each set of pixel data, whether or not a saturation of the each set of pixel data is higher than a prescribed value; and a fifth determining unit that determines, for each set of object data, whether or not a number of sets of pixel data that are contained in the each set of object data and that have a saturation higher than the prescribed value is greater than a number of sets of pixel data that are contained in the each set of object data and that have a saturation lower than or equal to the prescribed value;

wherein the first determining unit determines that a saturation level of each set of object data is the first level when the fifth determining unit determines that the number of sets of pixel data that are contained in the each set of object data and that have a saturation higher than the prescribed value is greater than the number of sets of pixel data that are contained in the each set of object data and that have a saturation lower than or equal to the prescribed value, and determines that a saturation level of each set of object data is the second level when the fifth determining unit determines that the number of sets of pixel data that are contained in the each set of object data and that have a saturation higher than the prescribed value is smaller than or equal to the number of sets of pixel data that are contained in the each set of object data and that have a saturation lower than or equal to the prescribed value;

wherein the first selecting unit selects, for each set of object data, the first profile as the active profile when the first determining unit determines that the saturation level of the each set of object data is the first level, and the second profile as the active profile when the first determining unit determines that the saturation level of the each set of object data is the second level; and wherein the conversion unit converts the input image data into print data by converting each set of pixel data based on the active profile selected for object data that contains the each set of pixel data.

6. The color conversion device according to claim 1, further comprising:

an edge detecting unit that detects, based on the input image data, edges in an image corresponding to the input image data; and a region dividing unit that divides the input image data into the plurality of regions, each region being defined by the edges.

7. The color conversion device according to claim 6, wherein the edge data detecting unit detects vertical straight lines each having a certain length and horizontal straight lines each having a certain length; and wherein the region dividing unit determines the plurality of regions defined by the horizontal straight lines and the vertical straight lines.

8. The color conversion device according to claim 6, further comprising:

a sixth determining unit that determines whether or not a saturation of each set of pixel data is higher than a prescribed value; and a seventh determining unit that determines, for each region, whether or not a number of pixel data that are contained in the each region and have a saturation higher than the prescribed value is greater than a number of pixel data that are contained in the each region and have a saturation lower than or equal to the prescribed value;

wherein the first determining unit determines that a saturation level of each region is the first level when the seventh determining unit determines that the number of sets of pixel data that are contained in the each region and that have a saturation higher than the prescribed value is greater than the number of sets of pixel data that are contained in the each region and that have a saturation lower than or equal to the prescribed value, and determines that a saturation level of each set of object data is the second level when the seventh determining unit determines that the number of sets of pixel data that are contained in the each region and that have a saturation higher than the prescribed value is smaller than or equal to the number of sets of pixel data that are contained in the each region and that have a saturation lower than or equal to the prescribed value;

wherein the first selecting unit selects, for each region, the first profile as the active profile when the first determining unit determines that the saturation level of the each region is the first level, and the second profile as the active profile when the first determining unit determines that the saturation level of the each region is the second level; and wherein the conversion unit converts the input image data into print data by converting each set of pixel data based on the active profile selected for a region that contains the each set of pixel data.

9. A color conversion method comprising:

determining a saturation of pixel data in input image data, the input image data being represented by input color signals and including a plurality of regions, the input color signals representing values in an input color space defined in an input-side device, each region containing at least one set of pixel data;

selecting, for each region, one profile among a plurality of profiles as an active profile based on the saturation of the at least one set of pixel data that is contained in the each region, each profile indicating correspondence relationships between the input color signals and output color signals representing values in an output color space defined in an output-side device; and converting the input image data into print data represented by output color signals, by converting each set of pixel data based on the active profile that is selected for a region that contains the each set of pixel data, wherein each output color signal has at least one among a black value corresponding to black color material and a plurality of chromatic color values corresponding to chromatic color materials, achromatic color being represented by using the black color material; the plurality of chromatic color materials; or the black color material and the plurality of chromatic color materials, the plurality of profiles include a first profile and a second profile, an output color signal contained in the second profile corresponding to each input color signal having a black value higher than a black value of an output color signal contained in the first profile for the same input color signal, the color conversion method further comprises:
determining whether a saturation level of each region is a first level or a second level lower than the first level based on the saturation of the at least one set of pixel data that is contained in the each region, and
selecting, for each region, the first profile as the active profile when the saturation level of the each region is determined as the first level, and the second profile as the active profile when the saturation level of the each region is determined as the second level.

10. A computer-readable recording medium that stores a color conversion program, the color conversion program comprising instructions for:

(a) determining a saturation of pixel data in input image data, the input image data being represented by input color signals and including a plurality of regions, the input color signals representing values in an input color space defined in an input-side device, each region containing at least one set of pixel data;

(a) selecting, for each region, one profile among a plurality of profiles as an active profile based on the saturation of the at least one set of pixel data that is contained in the each region, each profile indicating correspondence relationships between the input color signals and output color signals representing values in an output color space defined in an output-side device; and converting the input image data into print data represented by output color signals, by converting each set of pixel data based on the active profile that is selected for a region that contains the each set of pixel data, wherein each output color signal has at least one among a black value corresponding to black color material and a plurality of chromatic color values corresponding to chromatic color materials, achromatic color being represented by using the black color material; the plurality of chromatic color materials; or the black color material and the plurality of chromatic color materials, the plurality of profiles include a first profile and a second profile, an output color signal contained in the second profile corresponding to each input color signal having a black value higher than a black value of an output color signal contained in the first profile for the same input color signal, the color conversion program further comprises instructions for (b) determining whether a saturation level of each region is a first level or a second level lower than the first level based on the saturation of the at least one set of pixel data that is contained in the each region, and the (a) selecting selects, for each region, the first profile as the active profile when the (b) determining determines that the saturation level of the each region is the first level, and the second profile as the active profile when the (b) determining determines that the saturation level of the each region is the second level.

11. The computer-readable recording medium according to claim 10, wherein each region consists of one set of pixel data;

wherein the color conversion program further comprises instructions for (c) determining whether or not a saturation of each set of pixel data is higher than a prescribed value;

wherein the (b) determining determines that a saturation level of each set of pixel data is the first level when the (c) determining determines that the saturation of the each set of pixel data is higher than the prescribed value, and determines that a saturation level of each set of pixel data is the second level when the (c) determining determines that the saturation of the each set of pixel data is lower than or equal to the prescribed value;

wherein the (a) selecting selects, for each set of pixel data, the first profile as the active profile when the (b) determining determines that the saturation level of the each set of pixel data is the first level, and the second profile as the active profile when the (b) determining determines that the saturation level of the each set of pixel data is the second level; and wherein the converting converts the input image data into print data by converting each set of pixel data based on an active profile selected for the each set of pixel data.

12. The computer-readable recording medium according to claim 11, wherein the color conversion program further comprises instructions for:

(d) determining a theoretical black value of each set of pixel data;

(e) determining whether or not the theoretical black value of each set of pixel data is zero; and (b) selecting, for each set of pixel data, the first profile as the active profile when the (e) determining determines that the theoretical black value of the each set of pixel data is zero, wherein the (a) determining determines a saturation of each set of pixel data when the (e) determining determines that the theoretical black value of the each set of pixel data is not zero, wherein the (b) determining determines that a saturation level of each set of pixel data is the first level when the (e) determining determines that the theoretical black value of the each set of pixel data is not zero and the (c) determining determines that the saturation of the each set of pixel data is higher than the prescribed value, wherein the (b) determining determines that the saturation level of each set of pixel data is the second level when the (e) determining determines that the theoretical black value of the each set of pixel data is not zero and the (c) determining determines that the saturation of the each set of pixel data is lower than or equal to the prescribed value, and wherein the (a) selecting selects, for each set of pixel data, the first profile as the active profile when the (b) determining determines that the saturation level of the each set of pixel data is the first level, and the second profile as the active profile when the (b) determining determines that the saturation level of the each set of pixel data is the second level.

* * * * *